Nov. 23, 1971  A. G. THOMAS  3,621,740

TURNING MACHINE

Filed Feb. 19, 1970

INVENTOR

Albert G. Thomas

United States Patent Office 3,621,740
Patented Nov. 23, 1971

3,621,740
TURNING MACHINE
Albert G. Thomas, Charlottesville, Va., assignor to
Teledyne, Inc., Los Angeles, Calif.
Filed Feb. 19, 1970, Ser. No. 12,744
Int. Cl. B23b 5/00
U.S. Cl. 82—2
6 Claims

ABSTRACT OF THE DISCLOSURE

The present invention relates to an improved centerless turning machine in which a bar is tightly gripped in a rotating chuck and is supported near the free end of the bar, near the shaping tool, by means of a slip chuck which allows the bar to be turned or rotated therein. Novel features of this invention are automatic regulation of the clamping force of the slip chuck, means for breaking and directing chips from the bar, and movable trough-like means for catching and moving severed pieces of the bar.

---

There have been centerless turning machines but they have had slip chucks which had to be tightened or adjusted manually. Furthermore the disposition of turnings or chips has long been a problem. These chips have often built up in such masses that they interfered with the operation of lathes, other turning machines, or the like. Automatic or semi-automatic handling of severed workpiece portions is also desirable.

It is an object therefore to provide a turning machine having a chuck for rotating a bar or other workpiece which is supported by an automatically regulated slip chuck near the end of the bar being shaped by a tool.

Another object is to provide a turning machine for shaping a bar or the like, the machine having a chuck for turning the bar about its long axis and having a slip chuck for supporting the bar near the shaping tool, the degree of tightness of the slip chuck being pre-set.

A further object to provide chip or breaking means for helping to dispose of chips.

An additional object is to provide novel means for removing severed portions of workpieces in a lathe, bar turning machine, or other machine tool.

Other objects will be evident in the following description:

Figure 1:
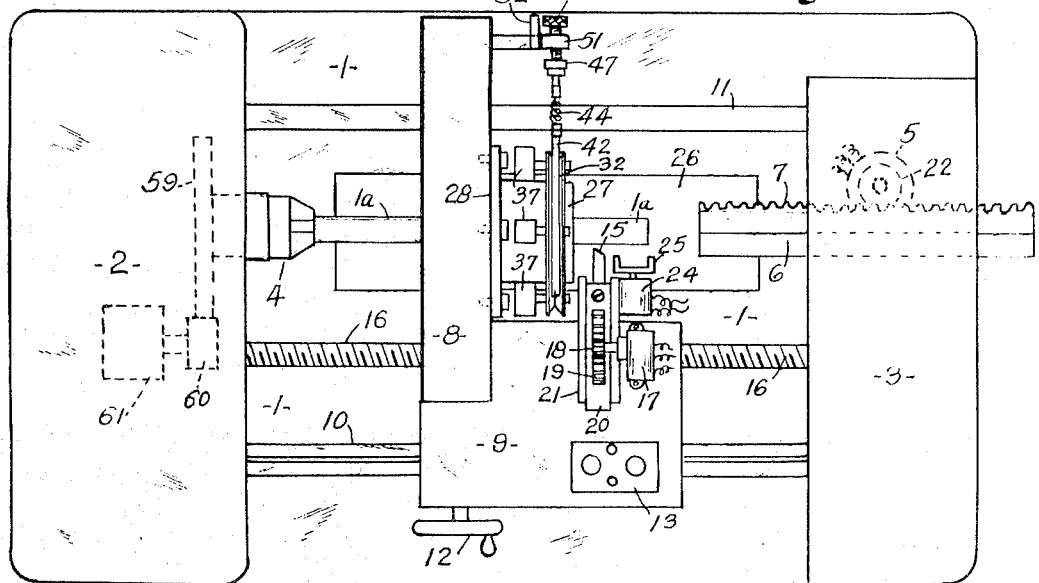
FIG. 1 is a top plan view of a bar turning machine having a manually tightened driving chuck and an automatically tightened bar-supporting chuck, and including chip breaker means, and means for removing severed bar portions.

In FIG. 1 machine bed 1 supports end housings 2 and 3 which contain, respectively, gear 59, motor pinion 60 and motor 61 for driving chuck 4; and motor 5, and movable trough 6 having edge rack teeth 7. Chuck 4 may be adjusted to hold rod or workpiece 1a firmly and to rotate this rod. Housing 8 is a part of carriage or slide 9, the assembly 8–9 being movable along tracks 10 and 11 extending from housing 2 to housing 3. A motor, not shown, may be placed in housing 2 or 3 for driving lead screw 16. These tracks may be supported on lathe bed 1. Units 8 and 9 have suitable surfaces for sliding along the tracks.

The operation of the machine may be handled manually by turning hand wheel 12 controlling carriage movement and by manipulating controls 13 which govern movement of the tool, rate of rotation of chuck 4, operation of motor 5, and other functions. Alternatively, housing 14 may contain computer means and tape drive and sensing means for controlling the motor in housing 2, which motor drives chuck 4 at a speed determined by the tape or other record in housing 14. This record also controls movement of carriage 9, through a motor in housing 2, which motor drives feed screw 16. The record also controls motor 17 mounted on carriage 9 and having pinion 18 meshed with rack 19 attached to tool holder 20 which is slidable in guide 21 which may have a trapezoidal cross section. The tape or other record also controls operation of reversible motor 5 which has pinion 22 meshed with rack 7. Therefore, trough-like member 6 can be moved to the right or left at suitable times controlled by the tape.

The various motors are connected to control unit 14 by means of conductors in cable 23.

Chuck 4 may be electrically operated by means of a motor or solenoid means and may be under control of the tape, or this chuck may be manually operated. Motor 24 has attached to its shaft a U-shaped knocker element 25 which is rotated by the motor 24 which also, may be controlled by the tape in housing 14. This knocker, while being rotated by motor 24, serves to break chips or cuttings into relatively short pieces and to throw the pieces down through well or cut-out 26 in machine bed 1. If desired, the motor axis may be directed at right angles to the position shown; and the knocker may comprise a linearly reciprocated element instead of a rotated member.

Figure 2:
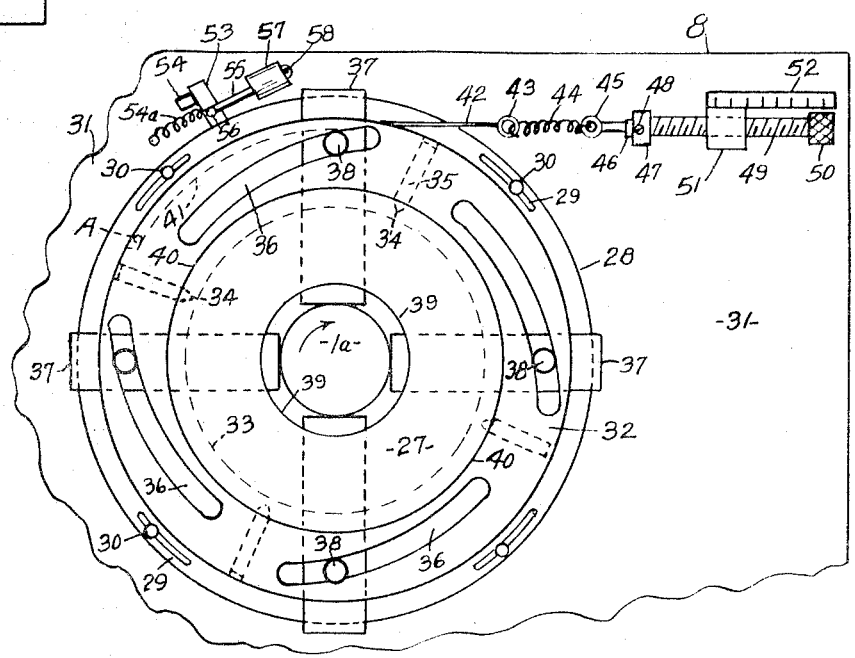
FIG. 2 is a face elevation of the slip chuck and associated mechanism shown in the machine illustrated in FIG. 1 except that damping means indicated in FIG. 1 is not shown in FIG. 2, for clarity.

The automatic slip chuck will now be described. An enlarged face view of this device is shown in FIG. 2. Thick annulus 27 is integral with coaxial ring or flange 28 which has arcuate slots 29 through which screws 30 are passed. These screws are threaded into holes in wall 31 of housing 8 and the heads of the screws are larger in diameter than the width of slots 29. These screws are adjusted so that ring 28 may be moved in a circular path through a limited angle. Ring or annulus 32 is rotatably supported on annulus 27 which has a peripheral groove 33 in which tips 34 of screws 35 are placed to prevent member 32 from falling off annulus 27. The screws 35 are threaded into radial holes in member 32. Ring 32 may therefore be rotated on member 27 through angles limited by the radial displacement of chuck members 37 which have projecting pins 38 working in flared slots 36 in ring 32. The members 37 are radially slidable in slots in annulus or ring 27 which has inner circular boundary 39. The inner tips of screws 35 are not threaded and may be cone shaped or cylindrical, as desired.

Ring 32 has peripheral groove 41 extending for a peripheral distance of a little less than one fourth of the circumference of the ring and flexible cord or wire 42 is attached to the ring near an end of the groove at point A. This cord is attached to small ring 43 in which an end of tension spring 44 is hooked, the other end of the spring being hooked into ring 45 attached to small rod 46 which is rotatable in cup 47 which has screw 48 working in a peripheral groove in rod 46. Threaded rod 49 is integral with or attached to cup 47 and is provided with knurled knob 50 which may be screwed onto rod 49 which may be turned in a threaded hole in post 51 extending out from housing surface 31. Several screws or pins 48 may be used at equi-distance locations around cup 47, to allow smooth turning of rod 49 and cup 47 without imparting excessive twist to spring 44. Scale 52 is attached to post 51 and the lengthwise position of rod 49 and the related tension in spring 44 can be gauged by the location of knob 50 relative to scale 52.

Arm 53 extends radially from flange or ring 28 and is normally yieldingly held against stop 54 on surface 31 by means of tension spring 54a fastened to casing surface member 31 and to arm 53. Rod 55 is pivoted to arm 53 at 56 and is also pivoted to a piston in damping cylinder 57 which may be pivoted to surface or housing member 31 at 58.

In operation, rod 1a is manually or automatically tightly clamped in drive chuck 4 which, when rotated, serves to rotate workpiece 1a about its lengthwise axis. Assuming that the various operations are controlled by a tape or other record in housing or cabinet 14, then motor 17, under tape control or other record control, will be rotated at various speeds and in directions toward and away from the axis of rod 1a to shape the rod in accordance with information stored on the tape unit in cabinet 14. Simultaneously feed screw 16 is rotated by a motor in housing 2 to shift carriage 9 to the right or left, at uniform or varying speed, according to the information on the tape. Before starting the operation of the tape control, however, the threaded rod or screw 49 is rotated by knob 50 until its position relative to scale 52 indicates a desired tension in spring 44 which yieldingly pulls cord 42 to cause a limited rotation of ring 32 in clockwise direction (FIG. 2). This rotation causes the pins 38 to be pressed toward the axis of rod 1a, thereby forcing the inner ends of elements 37 against rod 1a to support this rod for rotation. The clamping force of elements 37 is sufficient to provide a good bearing for rod 1a but is not sufficient to lock this rod against rotation. The required tension in spring 44 will depend somewhat upon the materials of elements 37 and workpiece 1a and also to some extent upon the diameter of rod 1a.

In order to allow angular movement of ring 32 the connected flange 28 is provided with arcuate slots 29. When spring 44 is given the required pre-set tension the flange 28 and attached arm 53 are rotated clockwise until the tension in spring 54a stops the rotation. The damping device 57 may be provided to prevent or reduce oscillatory action and adjustable means for tension in spring 54a, similar to that for spring 44, may be provided. The spring 44 should be sufficiently strong to overcome tension in spring 54a.

It will be seen that the tighter the tension in wire 42 the harder will elements 37 be pressed against workpiece 1a and the torque tending to rotate elements 37 and ring clockwise. Therefore flange 28 and attached arm 53 will be rotated clockwise through proportionally greater angles as pressure of elements 37 on workpiece 1a is increased. This increased pressure, however, causes increased stretching of spring 54a and shift of point A and wire 42 to the right (FIG. 2) thereby reducing the tension in spring 44, and accordingly reducing the inward radial pressure of elements 37 against workpiece 1a. Therefore this slip clutch is self-adjusting, automatically reducing the gripping force of the chuck on the workpiece as this force tends to become excessive.

The relatively large heads of screws 30 prevent flange 28 from falling away from surface 31 and the pin tips 34, working in groove 33, prevent ring 32 from separating from disc 27.

The tape may be programmed to cause trough-like member 6 to be moved to the left, under workpiece 1a, by energizing motor 5 when a portion of rod 1a is severed by tool 15. The severed portion drops into trough 6 which is then moved back to the right so that the severed rod portion can be retrieved. If desired, means for rotating member 6 about its long axis can also be employed so that the severed rod portion can be automatically dumped into a container.

The connection to motor 24 may be made manually or under tape control, to cause rotation of knocker 25 to break the chips and to throw them down into a receptacle beneath cut-out space 26 in the lathe bed 1. This machine, then, provides automatic adjustment of a slip chuck bearing in a lathe or turning machine. This is a substantial improvement over prior turning machines of centerless construction since manual adjustment of the slip chuck has been necessary and this has often required appreciable time even with a skilled operator. In addition, my means for catching a severed workpiece portion and the means for breaking and directing chips offer much improvement over prior construction and mode of operation.

I claim:

1. In a bar turning machine, tool holding means, chuck means for clamping a bar workpiece, means for rotating said chuck means, slip chuck means adjacent said tool holding means for grasping and partially supporting said bar for rotation about its axis, means for predetermining the degree of grasping of said bar by said slip clutch means, said predetermining means operating to reduce said degree of grasping when the torque on said slip clutch means produced by the rotating bar exceeds a pre-set value, an axially movable carriage, said slip cluch means and tool holding means being mounted on said carriage in adjacent relationship.

2. The bar turning machine as described in claim 1, said slip chuck means including a plurality of radially movable elements for engaging said bar, and means for moving said elements in unison.

3. The bar turning machine as described in claim 1, said slip clutch means including a plurality of moveable elements for engaging said bar and cam means for forcing said elements in unison against said bar, and said means for predetermining the degree of grasping of said bar by said slip clutch means including spring means operatively connected with said cam means and settable to provide predetermined stress in said spring means.

4. The bar turning machine as described in claim 3, and including means mounting said elements for radial movement and for rotary movement through a limited angle about the axis of said bar.

5. The bar turning machine as described in claim 1, said slip clutch means including a plurality of radially movable elements for engaging said bar, an annular slotted hub for supporting and guiding said elements, a cam ring rotatable around said hub through a limited angle for causing radial movement of said elements, a plate integral with said hub and rotatable through a limited angle, and a spring attached to said cam ring to urge rotation thereof in the same direction as the direction of rotation of said bar.

6. The bar turning machine as described in claim 5, and including damping means connected with said plate.

References Cited

UNITED STATES PATENTS

| 3,039,341 | 6/1962 | Stieglitz | 82—38 |
| 2,457,469 | 12/1948 | Hillman | 29—96 |

FOREIGN PATENTS

| 745,547 | 2/1956 | Great Britain | 82—20 |
| 750,932 | 6/1956 | Great Britain | 29—DIG 52 |
| 259,327 | 1/1968 | Austria | 82—2.5 |

LEONIDAS VLACHOS, Primary Examiner

U.S. Cl. X.R.

82—2.5, 38